E. G. KESLING.
INSCRIPTION ATTACHMENT FOR ROLL FILM CAMERAS AND METHOD OF PRODUCING LIGHT PRINTED INSCRIPTIONS.
APPLICATION FILED DEC. 1, 1915.

1,295,758. Patented Feb. 25, 1919.

WITNESSES:
Howard D. Orr
F. T. Chapman

Elmer G. Kesling, INVENTOR,

BY E. G. Siggers

Attorney

E. G. KESLING.
INSCRIPTION ATTACHMENT FOR ROLL FILM CAMERAS AND METHOD OF PRODUCING LIGHT PRINTED INSCRIPTIONS.
APPLICATION FILED DEC. 1, 1915.
1,295,758.
Patented Feb. 25, 1919.
4 SHEETS—SHEET 2.
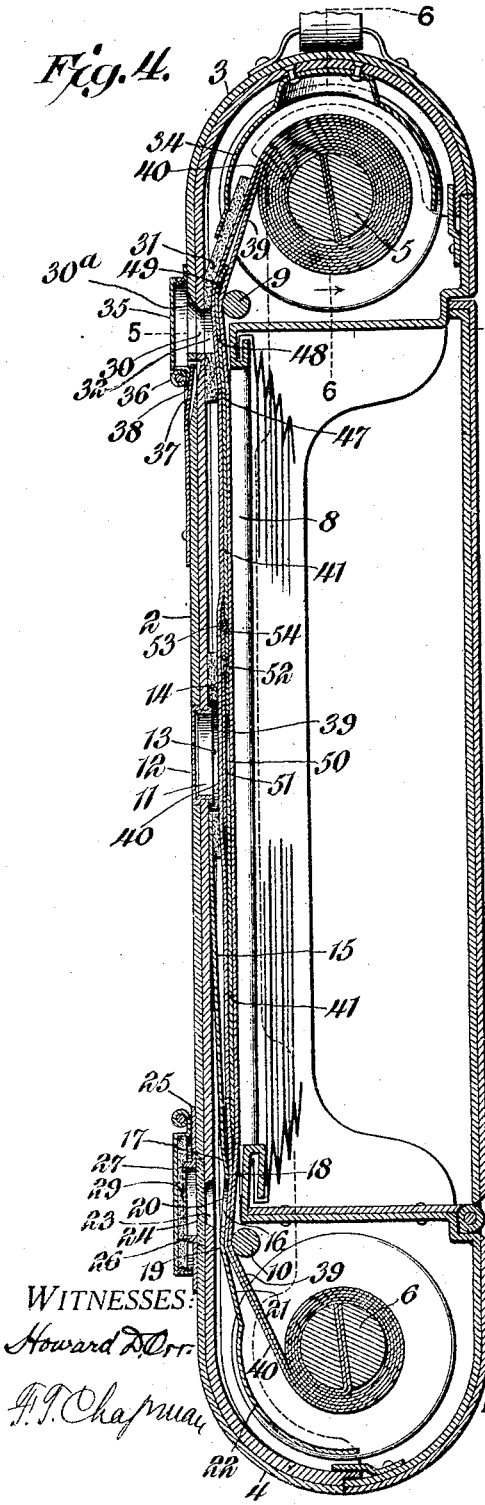
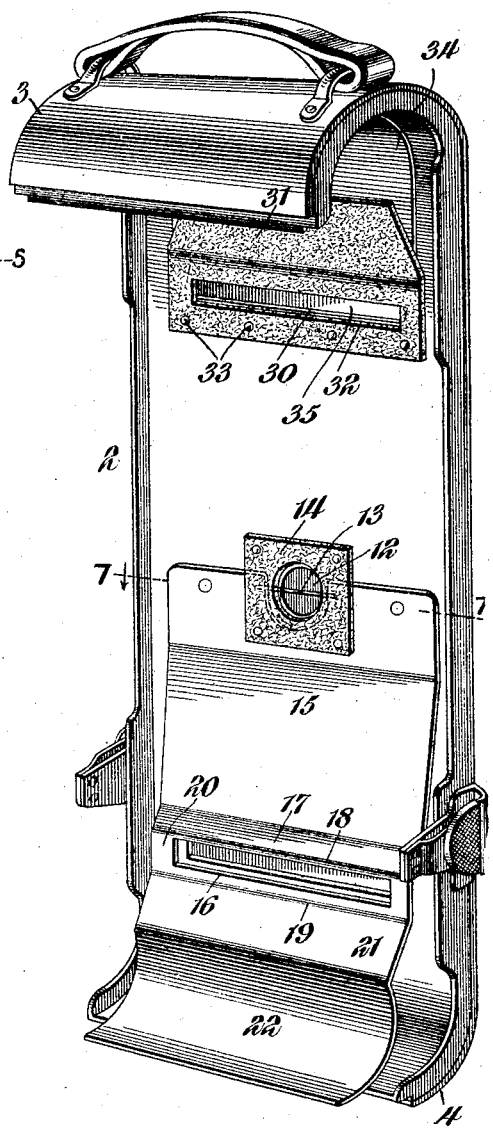
WITNESSES:
Howard D. Orr
F. J. Chapman
Elmer G. Kesling, INVENTOR,
BY E. G. Siggers
Attorney E. G. KESLING.
INSCRIPTION ATTACHMENT FOR ROLL FILM CAMERAS AND METHOD OF PRODUCING LIGHT PRINTED INSCRIPTIONS.
APPLICATION FILED DEC. 1, 1915.
1,295,758.
Patented Feb. 25, 1919.
4 SHEETS—SHEET 3.
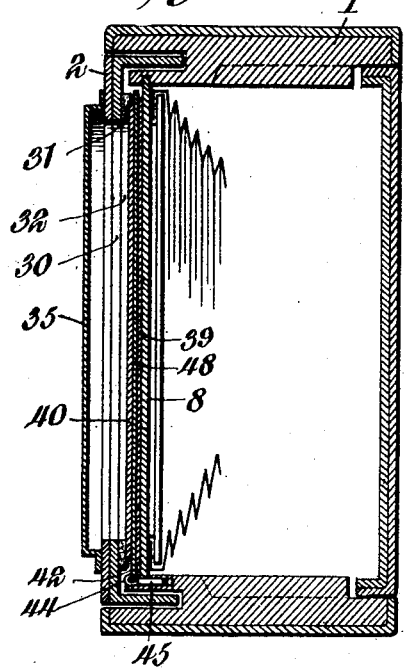
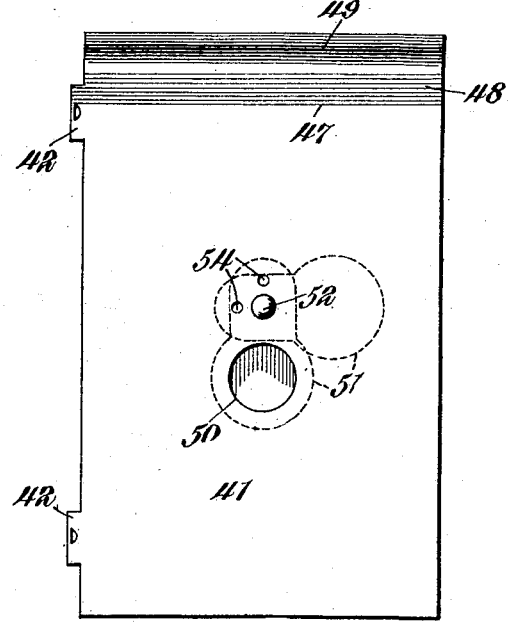
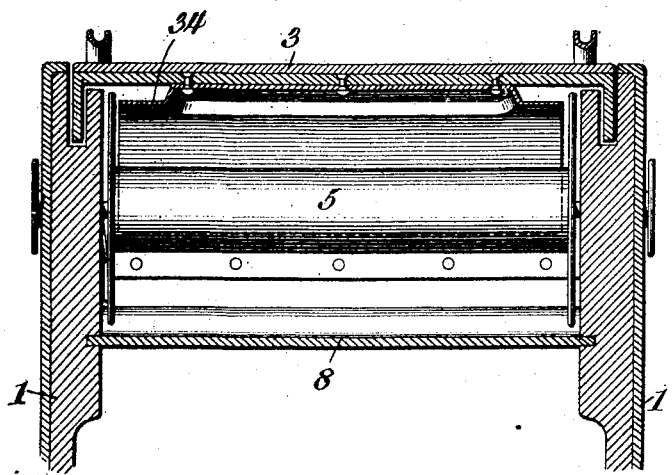
WITNESSES:
Howard D. Orr
H. T. Chapman
Elmer G. Kesling, INVENTOR,
BY E. G. Siggers
Attorney E. G. KESLING.
INSCRIPTION ATTACHMENT FOR ROLL FILM CAMERAS AND METHOD OF PRODUCING LIGHT PRINTED INSCRIPTIONS.
APPLICATION FILED DEC. 1, 1915.
1,295,758.
Patented Feb. 25, 1919.
4 SHEETS—SHEET 4.
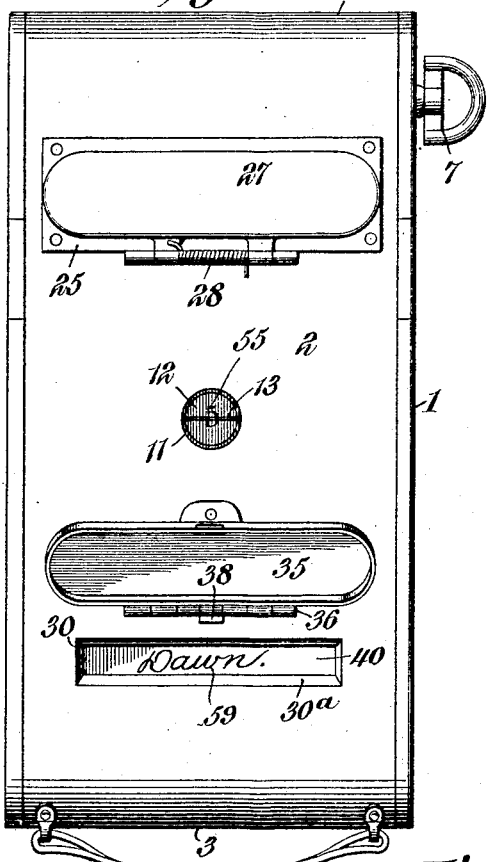
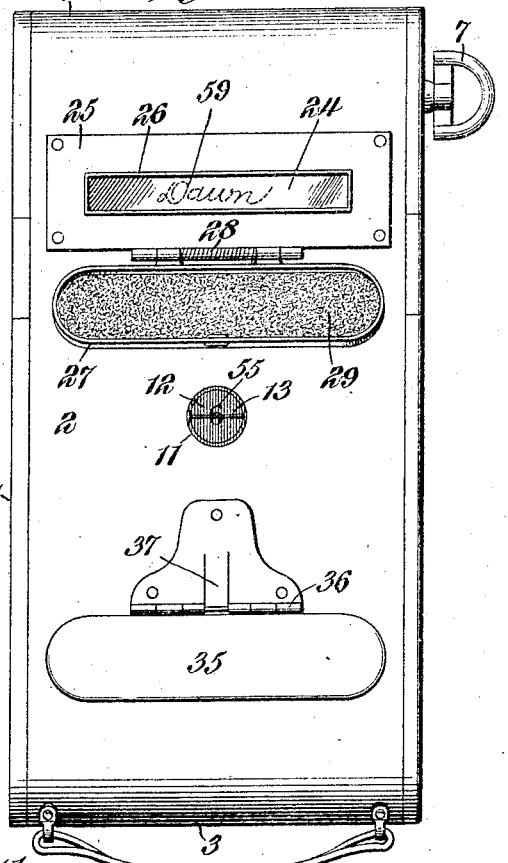
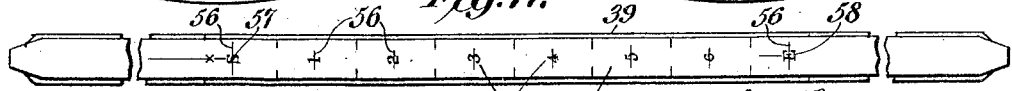
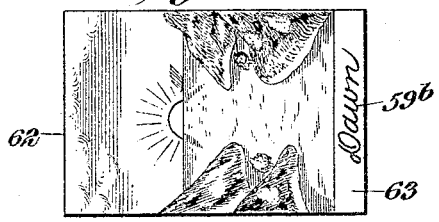
WITNESSES:
*Elmer G. Kesling,* INVENTOR,
BY
Attorney

UNITED STATES PATENT OFFICE.

ELMER G. KESLING, OF BLOOMFIELD, MISSOURI.

INSCRIPTION ATTACHMENT FOR ROLL-FILM CAMERAS AND METHOD OF PRODUCING LIGHT-PRINTED INSCRIPTIONS.

1,295,758.  Specification of Letters Patent.  Patented Feb. 25, 1919.

Application filed December 1, 1915. Serial No. 64,536.

*To all whom it may concern:*

Be it known that I, ELMER G. KESLING, a citizen of the United States, residing at Bloomfield, in the county of Stoddard and State of Missouri, have invented a new and useful Inscription Attachment for Roll-Film Cameras and Methods of Producing Light-Printed Inscriptions, of which the following is a specification.

This invention has reference to inscription attachments for roll film cameras, and its object is to produce directly upon the film while in the camera and by the aid of light a negative of a written title or other distinctive marking upon a restricted area closely associated with the portion of the film acted upon by the light image produced by the lens, whereby the positive print has a positive reproduction of the written title or other markings.

In accordance with the present invention the camera, which may be of any suitable commercial or special type adapted for using a roll film, is provided back of the area within which the film is exposed to the light image produced by the lens, with a plate of opaque material, preferably metal, and also preferably of an area to wholly or nearly cover the opening through which the sensitive film is exposed to the light image produced by the lens, the plate being also extended as near as practicable to the unwinding spool.

In conjunction with the attachment of the present invention there is used a roll film of peculiar construction shown, described and claimed in application Serial No. 64,537, filed by me on December 1, 1915, for a print titling film roll, in which the film consisting of a celluloid carrier with a sensitized emulsion on one surface is provided with a light transmitting backing, usually of paper, and of a character suitable for receiving pencil marks or marks from other writing implements. The paper backing is so related to the film that as the film is unrolled from one spool on to the other, the film passes along the plate in the back of the camera on the lens side thereof, while the paper backing moves along the plate on the side thereof remote from the lens, the plate thereby serving to shield the film from any actinic light which may find its way into the back of the camera, and the plate serves the additional function of providing a supporting table for the paper over a certain area at which it is designed that writing or other markings be placed upon the paper backing. For this last-named purpose the camera is provided with a normally closed door capable of being readily opened to expose a circumscribed area of the paper backing in turn backed up by the plate, and through which opening when the door is in the open position access is had to such circumscribed area of the paper for writing a title thereon with a lead pencil or other writing implement.

In accordance with the present invention the back of the camera is provided with a window capable of transmitting actinic light and normally closed by a door, so that actinic light may not pass through the window except at the will of an operator. The second door and its window is spaced away from the first door by a distance equal to the distance between two consecutive numbers or other characters on the film designating exposure positions of the film, so that after the writing of a title and the winding of the film upon the receiving spool to an extent to expose the next number in order at the customary red window, the written title is then positioned back of the window covered by the second-named door. Back of the window for transmitting actinic light there is provided a mask so arranged as to cover the film and its paper backing and press the two together in close contact and at the same time localize the actinic light upon that portion of the paper backing containing the title and that portion of the film overlaid by the entitled part of the paper, so that on the exposure of the paper and film beneath it to actinic light entering through the window, the film is affected by the light over an area determined by the opening through the mask, except where the film is protected by the writing.

The invention also includes various structural details to which reference will hereinafter be made.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Fig. 3 is a perspective view of the back of the camera showing the inner face thereof.

Fig. 4 is a central longitudinal front to rear section drawn on a larger scale than the preceding views.

Fig. 5 is a section on the line 5—5 of Fig. 4.

Fig. 6 is a section on the line 6—6 of Fig. 4.

Fig. 7 is an inner face view of an insert plate forming part of the invention.

Fig. 8 is a detail sectional view showing a form of hinge connection for the insert plate.

Fig. 9 is an elevation of the camera from the rear showing the writing door open for the reception of the title upon the backing strip.

Fig. 10 is a similar elevation to that of Fig. 9, but showing the exposure door open.

Fig. 11 is a view of the film roll extended and viewed from the backing-strip side.

Fig. 12 is a view of a titled negative as seen from the rear face.

Fig. 13 is a view of a positive made from the negative of Fig. 12.

Figure 1:
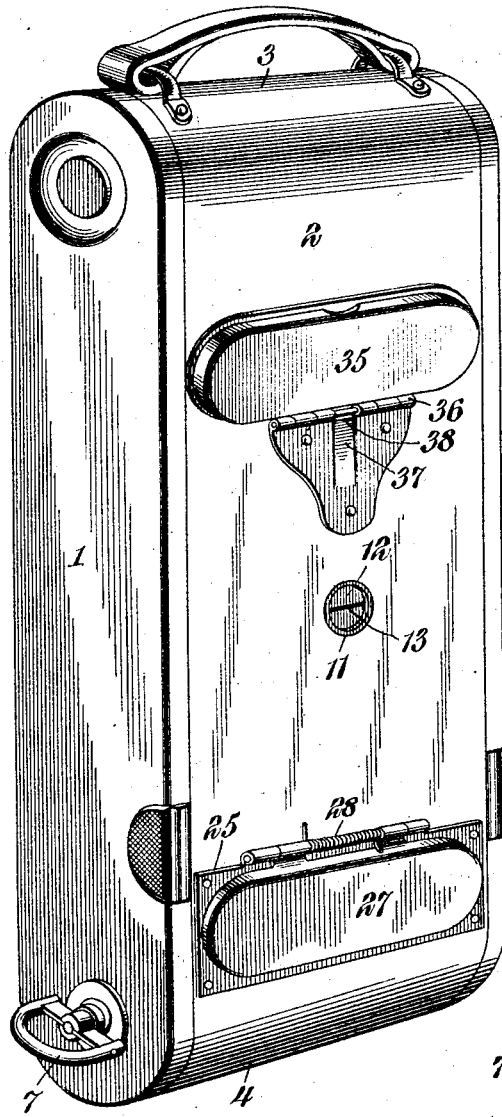
Figure 1 is a perspective view of a film roll camera equipped with the present invention, the view being of the back of the camera.
Figure 2:
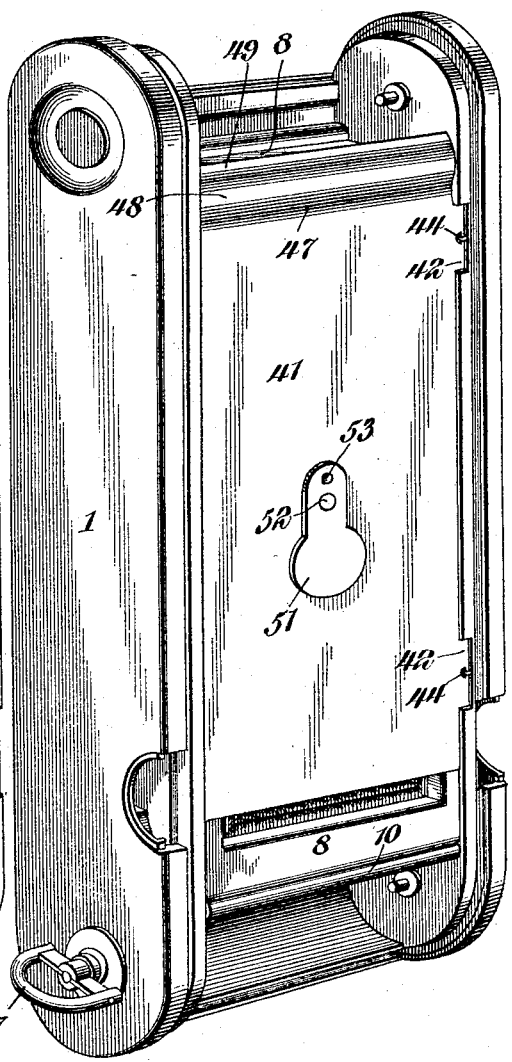
Fig. 2 is a perspective view of the camera with the back removed and the film roll omitted.

Referring to the drawings there is shown a camera box 1, the showing being that of a familiar form of film roll camera of the folding type, wherefore it is unnecessary to either show or describe the camera box in detail, except in so far as the construction is modified for the purposes of the present invention. Nor is the invention confined to a camera box of the particular type shown, since it may with or without some detail changes be adapted to other types of cameras.

The box 1 is provided with a removable back 2, which, except as modified for the purpose of the present invention, may generally correspond to the removable backs in cameras of the general type or particular model shown in the drawings. The back 2 has curved end portions 3, 4, respectively, which when the back is in place coact with the body of the camera to form receptacles for spools 5, 6, respectively, of which in the particular arrangement of the drawing the spool 5 constitutes the unwinding spool and the spool 6 constitutes the winding spool, the box 1 being provided with the customary winding key 7 for the manipulation of the spool 6. Within the box is the customary frame 8 determining the area of exposure of the film to the light image produced by the lens, and at opposite ends of the frame 8, which in most instances is an elongated rectangular frame, are guide rollers 9, 10, respectively, for the film. The back 2 is provided with the customary opening 11 having a red sight window 12, whereby the guiding numbers and other marks provided on the film backing may be viewed. In accordance with the present invention, however, the sight window 12 has associated with it a crosswise bar 13, which, as will hereinafter appear, is employed for the accurate positioning of the portion of the film to be exposed to the light image of the lens.

Surrounding the opening 11 on the inner face of the back 2 is a piece 14 of felt or other suitable material capable of preventing diffusion of light entering through the window 12. Fast to the inner face of the back 2 at a point about coincident with the opening 11 and extended crosswise of the back, the latter being of elongated form, is a plate 15 of opaque material, preferably metal. This plate is of sufficient length to extend from its point of attachment to the inner face of the back 2 about coincident with the opening 11 into partially embracing relation to the winding spool 6. The plate 15 is solid or unbroken from its point of attachment to the back of the camera to a point beyond the exposure opening of the frame 8 toward the spool 6 and is there provided with an aperture 16 elongated crosswise of the plate 15 and comparatively narrow in the direction of the length of the plate, the aperture 16 being for a purpose to be described. Adjacent to the aperture 16 on the side thereof toward the opening 11 the plate 15 is bent along a line indicated at 17 in a direction away from the back 2 to a point about coincident with the edge of the aperture 16 toward the opening 11 and is there bent along a line indicated at 18 again toward the inner face of the back 2 to another line 19 on the side of the aperture 16 remote from the line 18 to provide a substantially flat surface 20 including the aperture 16. As will hereinafter appear, the surface 20 with its aperture 16 constitutes a mask. From the line or bend 19 the plate 15 is once more directed away from the inner face of the back 2, as indicated at 21, so as to come within the flanges of the spool 6 and from the surface 21 the remainder of the plate is in the form of a curve 22 substantially concentric with the axis of the spool 6 within the flanges of said spool, wherefore the parts of the plate 15 including the sections 21 and 22 and the flanges of the spool 6 coactively serve as a light shield for the portion of the film traveling from the aperture 16 to and including the wound part upon the spool 6.

Coincident with the aperture 16 the back 2 is provided with a passage 23 therethrough, such passage corresponding generally in shape and position to the aperture 16. Covering the passage 23 and mounted in the back 2 is a light screen 24 of a character to dim the light passing therethrough or otherwise so controlling its actinic power that it will affect the photographic film but slowly with respect to the effect of unmodified actinic light thereon.

The light screen 24 is held in place by a frame 25 having its inner margins provided with an outstanding flange 26 and through this frame the light screen 24 is exposed.

Hinged to one long side of the frame 25 is a door 27 of a size to completely cover the screen 24 and the flanges 26 of the frame 25. The door 27 has its hinge in the form of a spring hinge with the spring indicated at 28, so that the door has a normal tendency to close and that face of the door toward the frame 25 carries a felt or other suitable pad 29 into which the flange 26 embeds when the door is in the closed position, thus then effectively excluding light from the screen 24 and opening 23. When the door is opened by moving it against the tendency of the spring 28, light has access to the opening or passage 23 through the screen 24 for a purpose which will hereinafter appear.

The opening 23 is located in the back 2 close to the roller 10 on the side thereof toward the opening 11. At the other end of the back 2 adjacent to the roller 9 and on the side thereof toward the opening 11 is a passage 30 extending crosswise of the back and comparatively narrow in the direction of the length of the back, the opening 30 corresponding generally in size to the aperture 16 without being limited to any exact conformity thereto, being preferably slightly broader and shorter than the aperture 16.

Surrounding the opening 30 on the inner face of the back 2 is a piece of felt 31 or other suitable light excluding material having a cut-out 32 conforming generally to the opening 30. The felt is suitably connected to the back 2 by rivets 33 or otherwise, and is prolonged on the side of the opening 30 toward the spool 5 to come within the flanges of the spool and is held from moving away from such position by a curved shield 34 made fast to the corresponding rounded end of the back 2 in position to lodge between the flanges of the spool and serve as a light shield in conjunction with such flanges protecting the turns of the film wound upon the spool 5. The shield 34 where engaging the felt 31 serves also as a spring holding the felt against the unwinding film.

The opening 30 is normally closed by a door 35 having a normal constraint toward both the closed and the open position from opposite sides of a neutral position, this being brought about by means of a hinge 36 in conjunction with a spring 37 and strop member 38 carried by the door and engaged by the spring.

The roll film used in the camera of the present invention comprises a sensitized carrier 39 which may be considered as composed of a strip of celluloid of suitable length with a sensitized emulsion on one face and at the ends of the film are strips of opaque material of suitable length such as are shown and described in the aforesaid application filed on even date herewith for print titling film roll. Such film roll is backed up by a strip 40 of light transmitting material, such, for instance, as paper of a character to transmit actinic light to the sensitive film where desired and also to take markings from writing implements, particularly from such a writing implement as a lead pencil.

Such a roll film is free from any material normally preventing the transmission of actinic light through the backing strip to the sensitive surface of the film either throughout the length of the film, or for determined portions thereof. In the use of a camera equipped with the invention it becomes necessary to protect the sensitive film at a certain point from the effect of actinic light, and at other points to admit actinic light thereto in addition to the arrangements commonly provided for the exposure of the sensitive film to the light image produced by the camera lens.

Lodged within the camera is an insert plate 41 of opaque material preferably of metal. This plate is elongated in the direction of the length of the back of the camera and along one long side is provided with spaced ears 42 by means of which the body of the plate is hinged to one side of the camera on the inner face thereof. The hinges are conveniently in the form of split spring pins 43 each terminating at one end in an eye 44 engaging the respective ear 42. The legs of each split pin 43 have a normal tendency to diverge and are introduced into a tubular holder 45 seated in the corresponding side of the camera body, the ends of the legs being outturned, as shown at 46, to temporarily lock the pin to the tube 45 when inserted therein. The eye 44 is of sufficient size to make a loose fit with the corresponding ear 42, so that the plate 41 has some play on its hinge supports.

The plate 41 is of a width to rest upon the sides of the frame 8 and is or may be of a length to substantially cover the opening of the frame 8 and to extend beyond the roller 9 toward the spool 5. The plate 41 is of a width to completely back up the passage 30 and adjacent to said passage on the side thereof toward the opening 11 the plate is bent along a line generally indicated at 47 toward the inner face of the back 2 and along a line about coincident with the roller 9 it is bent away from the back 2, thus producing a flat section 48 at a slight angle to the main body of the plate and a rounded curved end 49 directed toward the spool 5.

The plate 41 at a point coinciding with the opening 11 is provided with an opening 50 normally closed by a cover 51 pivoted by a pin 52 to that face of the plate 41 toward the back 2. The cover 51 is held in either the open or the closed position by means of a projecting portion 53 struck up from the cover 51 toward the plate 41 and engaging in depressions or holes 54 in the plate 41 and suitably located for the purpose.

The camera is loaded in the customary manner by removing the back 2 and unrolling a sufficient amount of the protecting opaque extension of the film and backing paper, the latter having its forward end attached to the opaque extension or strip. The plate 41 is turned on its hinges sufficiently to raise the other edge enough to permit the placing of the opaque extension under the plate and the light transmitting paper over the plate, after which the plate is closed down upon the frame 8, the spool 5 inserted in the camera, and the free end of the film roll is threaded through the hub of the spool 6 and the spool is turned enough to connect the forward end of the film roll thereto.

Now, the back 2 is replaced with both doors 27 and 35 in the closed position, bringing the felt strip 31 against the paper backing, thus holding it firmly against the curved end 49 of the plate 41 with the film side of the film roll engaging the roller 9. The felt 31 constitutes both a light-tight connection with the white paper backing and a yieldable cushion whereby the light-tight connection is maintained irrespective of variations in thickness, especially in the event of the passage of stickers employed to connect the sensitive film with the opaque paper extensions at the ends thereof.

The roller 9 serves to hold the sensitive surface of the sensitive film away from actual contact with the end bar of the frame 8 adjacent thereto, while the plate 41 from the roller 9 to the bend 47 serves to direct the sensitive film so that the sensitive emulsion is brought at the bend 47 into the focal plane of the camera without bringing the sensitive film into rubbing engagement with the end bar of the frame 8, since such rubbing engagement might prove harmful. The same condition occurs with respect to the other end of the plate 41 and the roller 10, whereby the emulsion side of the film is held from rubbing engagement with that end bar of the frame adjacent to the roller 10. Also, the last-named end bar may be slightly depressed to prevent the plate 15 from forcing the sensitive emulsion into rubbing contact with such end bar. Between the bend 47 and the other end of the plate 41 the sensitive side of the film is held in the focal plane by such plate, the plate 41 holding the long sides of the film against the long sides of the frame 8.

When the back 2 is in place the plate 15, being forced in opposition to its normal tendency toward the back 2, is in close contact about the aperture 16 with the backing strip 40 holding the latter tightly against that face of the film remote from the sensitive emulsion. When the door 27 is opened, actinic light finds its way through the light modifying element 24, through the slot 23 and aperture 16 to and through the light transmitting backing strip 40 to the celluloid carrier of the emulsion and through the latter so as to affect the sensitive emulsion except where shielded by writing which may have been placed upon the backing strip 40. Light admitted to the modifier 24 is so reduced in its actinic value by the modifier as to act but slowly with relation to the normal sensitiveness of the sensitive emulsion for a purpose which will presently appear.

The backing strip 40 is supplied with suitable indicia 55 shown in Fig. 11, such indicia being customarily in the form of digits in serial order so placed that when any one of the digits is visible through the window 12 a section of the sensitive surface of the film is included within the opening of the frame 8. Each digit 55 is provided with a mark 56 by means of which the operator is assured of the proper positioning of the film. At one end of the series of digits, and suitably spaced therefrom, is another indicating mark 57 shown in Fig. 11 as the letter "S," while at the other end is another indicating mark 58 shown as the letter "E."

When the film is placed in the camera and rolled upon the spool 6 for a sufficient distance to disclose the letter S at the window 12, with the cross mark 56 provided at the letter S coinciding with the bar 13 at the window 12, the operator may open the door 35 with the camera held up-side-down with relation to the ordinary exposure position for producing a negative lengthwise of the film. Now, with a writing implement such as a lead pencil, the operator may place his signature or some other identifying mark upon the then visible portion of the strip 40. After this is done more of the film is rolled upon the spool 6 until the digit "1" appears at the window 12 and its cross mark 56 is brought into coincidence with the bar 13. When the digit 1 is properly positioned and visible through the window 12, then the signature or other identifying mark disclosing ownership of the film roll, is located back of the opening covered by the door 27, so that on opening such door light will enter therethrough and passing through the light modifier 24 to the celluloid carrier and through the latter to the back of the sensitive emulsion, will affect the latter through an area determined by the size of the aperture 16 except where the sensitive emulsion is protected by the strokes of the signature.

The door 27 snaps shut as soon as released and it is customary to close the door 35 as soon as any writing placed upon the strip 40 has been completed.

The camera may now be manipulated in the usual manner to expose the positioned section of the sensitive emulsion to the light image produced by the lens, and then the door 35 is again opened and a title is written upon that portion of the strip 40 appearing through the slot 30, after which the door 35 is again closed. Such a title is indicated at 59 in Fig. 9. More of the film is now wound upon the spool 6 until the next digit in order is visible through the window 12 and is properly positioned with respect to the cross bar 13. The door 27 is then opened and the portion of the sensitive emulsion which thus becomes exposed to light through the modifier 24 is affected by such light in the manner already described with respect to the signature. The camera may be again manipulated to expose the portion of the sensitive surface then properly positioned and the procedure may be repeated until all the sensitive film has been used, this being indicated by the appearance of the letter "E" at the window 12, thus apprising the operator that the title written for the last portion of the film is in position to be exposed through the opening covered by the door 27. The position of the writing produced upon the strip 40 through the opening 30 when moved therefrom into coincidence with the light modifier 24 is indicated in Fig. 10, in which figure the door 27 is shown in the open position, so that light may act through the aperture 16 upon the sensitive film except when prevented from doing so by the applied signature.

The slot 30 has one edge 30ª beveled to facilitate the manipulation of the pencil or other writing implement acting upon the strip 40 where exposed to view through the slot 30.

The emulsion used upon the sensitive films usually employed in film cameras is highly sensitive to actinic light, and if light of the actinic value of that directed to the sensitive film by the lens should be allowed to reach the area of the film defined by the aperture 16, the film would there be greatly overexposed during the time necessary for the operator to open the door 27 and allow it to close, even though this be done as rapidly as the operator might be able to do it. While special devices could be used for exposing the film where coinciding with the applied title or other marks, this would mean complexity of structure. In order to simplify the arrangement so as to permit the use of exposure means such as the door 27 to be operated by the human hand, the light modifying medium 24 is employed, and this medium is of such a nature as to permit the opening of the door 27 for an appreciable time without overexposing the film. The light modifying medium 24 may consist of celluloid so treated as to properly reduce the actinic value of the light passing therethrough, or it may be made of commercial smoked glass, or of any other medium which by reason of its characteristics is suitable for the purpose.

Experience has shown that the exposure of the title section of the film should be such that the density in the developed negative of the area containing the title should correspond approximately to about the average density of the negative obtained from the light image. In order to provide sufficient latitude for obtaining such desirable density, experience has shown that the minimum time of exposure of the title section of the film should be about two seconds, while the maximum time with the same light modifier may reach five or six or more seconds, in accordance with the light conditions.

A negative produced in the manner described will have somewhat the appearance indicated in Fig. 12 where there is shown a negative 60 with a section 61 at one end containing a negative 59ª of the title 59 shown in Fig. 9, the density of the developed film section 61 corresponding to the average density of the negative 60 where the relative exposures have been about correct.

When a positive such as shown at 62 in Fig. 13 is produced by the negative 60, there is at one end of the positive a section 63 with a positive title 59ᵇ thereon. Under the circumstances described the section 63 will in a positive print made from the negative 60, appear white or nearly so, while the title 59ᵇ will show quite dark, and, therefore, be distinctly readable.

Since lead pencil marks are to some extent transmissible of light, the title may appear deeply gray on the finished print, but if some opaque writing material, such as india ink or the like be employed in producing the title upon the backing strip 40, the title may appear quite black upon the finished print. The most pleasing results are obtained when the background of the title is slightly gray in a black and white print, since a white background is liable to be distracting to the eye. Almost any desirable effect may be produced in a finished print by varying the exposure of the sensitive paper in the printing operation over that area on which the title appears.

The light transmitting backing strip 40 may be quite thin, and hence the writing thereon is in close relation to the sensitive surface of the film while the latter is being exposed for the production of a negative of the title. It therefore becomes feasible to produce the title in thin lines with a correspondingly pleasing effect in the finished print.

In the arrangement shown in the drawings the title appears at the bottom of the finished print with the picture upright. When the picture is taken horizontally the title appears along the left hand side thereof.

In order to adapt the camera shown in the drawings to ordinary roll films, the cover 51 is provided since it is necessary in the structure shown to have the plate 41 in the camera box, in order to maintain the sensitive surface of the film in the focal plane. When the ordinary roll film is used, the film with its backing strip is threaded through the camera under the plate 41, that is, the entire film passes on the lens side of such plate. Under such circumstances the cover 51 is moved on its pivot so as to temporarily lock in the open position, whereby the exposure numbers on the backing sheet of the ordinary roll film become visible through the window 12.

The plate 41 is so attached to the body of the camera as to be readily removed therefrom, this being made possible by the split eye pins 43, wherefore on the removal of the plate 41 the ordinary camera back may be substituted for the back 2.

In the foregoing description no mention is made of certain parts employed for holding the back to the body of the camera since the parts shown for the purpose are in common use in roll film cameras and need no description.

While the backing strip of the film roll has been described as of a character to be transmissible of actinic light throughout its length, it may be so constructed as to be opaque to actinic light except where covering the sensitive film. Indeed, it is only necessary that the title receiving areas be transmissible of actinic light and the remainder of the backing strip may be opaque to actinic light, and this whether or not the title receiving light transmissible areas extend all the way across the backing strip.

What is claimed is:—

1. An inscription means for roll-film cameras for use in connection with a roll film having a single backing sheet of translucent material, comprising film-protecting means providing direct access to the backing sheet of the installed roll film for the direct application to said backing sheet of an inscription having contrastingly greater light retarding properties than the adjacent part of the sheet, means located where the inscription is applied to the backing sheet for shielding the sensitive emulsion of the film from actinic light, and means in spaced relation to such location for admitting actinic light to the sensitive emulsion of the film through a circumscribed portion of the backing sheet surrounding the inscription.

2. An inscription attachment for roll-film cameras for the application of an inscription in light retarding characters to a roll film having a translucent backing sheet, comprising a film-protecting casing providing direct access to the backing sheet of an installed roll film for the application of an inscription thereto, means for shielding the sensitive emulsion of the film from actinic light at the location where the inscription is applied to the backing strip, and means in spaced relation to such location for admitting actinic light to the sensitive emulsion through a circumscribed portion of said backing surrounding said inscription.

3. In an inscription means for roll-film cameras for use in connection with a roll film provided with a translucent backing sheet, means for protecting the sensitive surface of the film from access of actinic light and constituting a writing table for supporting the translucent backing, said table being accessible from the exterior of the camera to permit the direct application by a pen or pencil of an inscription to that part of the backing sheet on the table, and means located in spaced relation to the first-named means for exposing a restricted area of the sensitive emulsion of the film to actinic light passing through the portion of the backing of the film bearing the inscription.

4. In an inscription means for roll-film cameras for use in connection with a roll film provided with a translucent backing sheet, means for protecting the sensitive surface of the film from access of actinic light and constituting a writing table for supporting the translucent backing to permit the application thereto by a pen or pencil of an inscription in light resisting means obtained from the pen or pencil, and means located in spaced relation to the first-named means for exposing a restricted area of the sensitive emulsion of the film to actinic light passing through the portion of the backing of the film bearing the inscription applied thereto, said last-named means being provided with means for reducing the actinic effect of the light passing therethrough.

5. An attachment for cameras for the application of inscriptions to a roll film provided with a translucent backing sheet capable of receiving the inscription in light retarding characters, said attachment having an opening through the back for exposing to view a portion of the backing sheet of the roll film for the application of the inscription thereto and having at the opening means for preventing access of actinic light to the sensitive emulsion of the film, said attachment also having another opening through the back spaced in the direction of travel of the film from the first-named opening and provided with means associated therewith for there exposing a circumscribed area of the sensitive emulsion of the film to the action of actinic light through that portion of the backing sheet immediately about the applied inscription.

6. An attachment for cameras for the application of an inscription in light retarding characters to a roll film provided with a translucent backing sheet, said attachment having openings through the back spaced apart by a distance equal to the length of travel of the film from one position to the next position in order, one opening exposing the backing sheet of the film to view for the production of the inscription thereon by a writing implement and the other opening having a normal closure movable to a position to admit actinic light through the backing sheet to the sensitive emulsion of the film, and said second-named opening being of a size limiting the admitted light to a circumscribed area including and surrounding the inscription applied to the backing strip at the first-named opening.

7. An attachment for cameras for the application of an inscription in light retarding characters to a roll film provided with a translucent backing sheet, said attachment having openings through the back spaced apart by a distance equal to the length of travel of the film from one position to the next position in order, one opening exposing the backing sheet of the film to view for the production of the inscription thereon by a writing implement and the other opening having a normal closure movable to a position to admit actinic light through the backing sheet to the sensitive emulsion of the film, and said second-named opening being of a size limiting the admitted light to a circumscribed area including and surrounding the inscription applied to the backing sheet at the first-named opening, said second opening having means associated therewith for reducing the actinic power of the light directed to the sensitive emulsion through said opening.

8. A camera, for using a roll film with a translucent backing strip, provided with a back having spaced openings therethrough, an insert plate for interposition between the film and the backing strip and extending across one of the openings, said plate constituting a light shield for the portion of the sensitive film opposite the opening crossed by the plate, and also constituting a writing table for supporting the backing strip opposite said opening, and a closure for the second opening movable to the open position to admit light therethrough to the backing strip and through it to a circumscribed area of the sensitive emulsion of the film.

9. A camera, for using a roll-film with a translucent backing strip, said camera having openings through the back spaced apart by a distance equal to the travel of the roll film from one position to the next position in order, a plate located within the camera and extending across one of the openings and adapted to be interposed between the sensitive film and the backing strip thereof, said plate constituting a light shield for the sensitive film at the said opening and also constituting a writing table for the backing strip at said opening, a masking plate within the camera opposite the second opening, and a camera closure for the second opening movable into position to admit light therethrough to and through the backing strip at said opening to an area of the sensitive emulsion determined by the size of the aperture through the masking plate.

10. A camera, for using a roll-film with a translucent backing strip, said camera having openings through the back spaced apart by a distance equal to the travel of the roll film from one position to the next position in order, a plate located within the camera and extending across one of the openings and adapted to be interposed between the sensitive film and the backing strip thereof, said plate constituting a light shield for the sensitive film at the said opening and also constituting a writing table for the backing strip at said opening, a masking plate within the camera opposite the second opening, and a camera closure for the second opening movable into position to admit light therethrough to and through the backing strip at said opening to an area of the sensitive emulsion determined by the size of the aperture through the masking plate, said second opening being provided with means for reducing the actinic power of light directed therethrough.

11. A camera, for using a roll-film with a translucent backing strip, said camera having slots through the back spaced apart lengthwise of the roll film by a distance equal to the movement of the film from one position to the next position in order, an insert plate within the camera adjacent to the back thereof for interposition between the sensitive film and the backing strip therefor and also for interposition between the sensitive film and one of the slots to shield the sensitive film from access of actinic light entering through said slot, with said plate serving as a support for the backing strip of the film during the application of an inscription to said strip through said slot, and a closure for the other slot having a normal tendency toward the closed position and movable to the open position to admit actinic light to the backing strip for transmission therethrough to the sensitive emulsion of the film, said camera also having means for restricting the area of the sensitive film affected by light reaching the latter through the second-named slot.

12. A camera, for using a roll-film with a translucent backing strip, said camera having slots through the back spaced apart lengthwise in the direction of travel of the film by a distance equal to the movement of the film from one position to the next position in order, an insert plate within the camera adjacent to the back thereof for interposition between the sensitive film and the backing strip therefor and also for interposition between the sensitive emulsion of the film and one of the slots to shield the sensitive film from access of actinic light entering through said slot, with said plate serving as a support for the backing strip of the film during the application of an inscription to said strip through said slot, and a closure for the other slot having a normal tendency toward the closed position and movable to the open position to admit actinic light to the backing strip for transmission therethrough to the sensitive emulsion of the film, said camera also having means restricting the area of the sensitive film affected by light reaching the latter through the second-named slot, said second named slot having light modifying means associated therewith for reducing the actinic power of the light reaching the film therethrough.

13. A camera, for using a roll-film with a translucent backing sheet and arranged for access to a portion of the backing strip while the roll-film is within the camera for the production of an inscription in light retarding form directly upon the backing, said camera having means at the location where the backing is accessible for protecting the sensitive emulsion of the film from access of actinic light thereto, means located in spaced relation to that part of the camera where the backing sheet is accessible for the application of an inscription for providing a light transmitting field of restricted area in surrounding relation to the title, and means associated with the last-named means for admitting actinic light through the inscribed backing sheet to the sensitive emulsion of the film within the area defined by said field.

14. A camera, for using a roll-film with a translucent backing, said camera being provided with openings through the back spaced apart by a distance equal to the length of travel of the film from one position to the next position in order with one opening exposing the backing strip of the film to view for the production thereon by a writing implement of an inscription in light resisting material and the other opening having means for temporarily admitting actinic light to the sensitive emulsion of the film, and means associated with the second-named opening for holding the backing strip of the film in close engagement with the film and provided with an aperture defining a restricted area to exposure about the inscription produced upon the backing strip.

15. A camera, for using a roll-film with a translucent backing strip, said camera being provided with openings through the back spaced apart by a distance equal to the length of travel of the film from one position to the next position in order, one opening exposing the backing strip of the film to view for the production thereon of an inscription by a writing implement, and the other opening having means associated therewith for exposing the sensitive emulsion of the film to actinic light throughout a restricted area about the inscription applied to the backing strip, and a plate of opaque material within the camera hinged at one edge to the body of the camera and of a length to extend across the first-named opening to provide a support for the backing strip when applying the inscription and to protect the sensitive emulsion from access of actinic light.

16. A camera for using a roll-film with a translucent backing strip, said camera being provided with a removable back having openings therethrough spaced apart by a distance equal to the length of travel of the film from one position to the next position in order, one opening exposing the backing strip of the film to view for the production thereon of inscription by a writing implement and the other opening having means associated therewith for the admission of light to the sensitive surface of the film through the backing strip within a restricted area of the portion of the backing strip containing the applied title, a plate within the camera in position to be interposed between the sensitive film and the backing strip thereof and to extend across the first-named opening to shield the film from actinic light and provide a writing table for the backing strip, and means carried by the camera back in position to extend over the film wound upon the film carrying spools to prevent access thereto of actinic light when the back of the camera is in place.

17. A camera, for using a roll-film with a translucent backing strip, said camera being provided at the back with means for exposing the backing strip of the film to view for the direct application of a light retarding inscription upon the visible face thereof, means for the subsequent exposure of the inscribed portion of the backing strip and the sensitive emulsion of the film coinciding therewith to actinic light to produce an exposure of the inscription on the sensitive emulsion, and means within the camera in light shielding relation to the winding spool of the film and the parts of the film leading toward and from the area of exposure of the film to the inscribed portion of the backing strip to prevent access of actinic light directed to the inscribed portion of the backing to the portion of the sensitive film leading to and carried by the winding spool.

18. A camera for using a roll film with a translucent backing strip, said camera being arranged to permit access to the backing strip of the film, while the latter is in the camera and the sensitive emulsion is protected from actinic light, for the direct application of light retarding inscriptions to the backing strip, means spaced from the point of access in the direction of the travel of the film in the camera for the exposure of circumscribed areas of the sensitive emulsion of the film to correspondingly circumscribed areas of the inscribed backing strip, and means for restricting the area of the sensitive emulsion exposed to actinic light about the inscription, comprising a mask in position to engage the backing strip about the inscription and hold the strip in close contact with that portion of the film constituting the carrier for the sensitive emulsion.

19. A camera, for using a roll-film with a translucent backing strip, and arranged to permit access to the backing strip of the film, while the latter is within the camera and the sensitive emulsion of the film is protected from actinic light, for the direct application of a light retarding inscription to the backing strip, means for the exposure of circumscribed areas of the sensitive emulsion of the film to correspondingly circumscribed areas of the inscribed backing strip, and means for restricting the area of the sensitive emulsion exposed to actinic light about the inscription, comprising a mask in position to engage the backing strip about the applied inscription and hold said backing strip in close contact with that portion of the film constituting the carrier for the sensitive emulsion, said mask comprising a plate elastically mounted on the inner face of the back of the camera and provided with an aperture defining the area of exposure for the inscribed portion of the backing strip and also having a prolongation shaped to partially embrace the winding spool of the film between the flanges thereof and constituting means for protecting the portion of the film leading from the apertured part of the mask and the portion of the film carried by the winding spool.

20. A camera, for using a roll-film with a translucent backing strip, said camera being provided with an opening for the production therethrough by a writing implement of an inscription directly upon a visible portion of the backing strip of the roll-film while in the camera, the strokes of the inscription being in material taken from the writing implement and resistant to the passage of actinic light, and means located in spaced relation to said opening for the exposure of the sensitized emulsion of the film to actinic light through the backing strip over a restricted area immediately surrounding the inscription produced upon the backing strip.

21. A camera, for using a roll-film with a translucent backing strip, said camera being provided with an opening for the production therethrough by a writing implement of an inscription directly upon a visible portion of the backing strip of the roll-film while in the camera, the strokes of the inscription being in material taken from the writing implement and resistant to the passage of actinic light, and means located in spaced relation to said opening for the exposure of the sensitized emulsion of the film to actinic light through the backing strip over a restricted area immediately surrounding the inscription produced upon the backing strip, the last-named means having means associated therewith for reducing the actinic value of the light there acting upon the sensitized emulsion.

22. A camera for using a roll-film with a translucent backing strip and provided with an opening through the back for exposing the backing strip of the film to view for the production thereon of an inscription by a writing implement, and a plate within the camera adapted for insertion between the backing strip and the sensitive film, said plate being of a length to extend across and beyond the opening through the back of the camera toward the unwinding spool end of the camera and there curved in the direction of travel of the film and toward that portion of the film constituting the carrier for the sensitized emulsion.

23. A camera for using a roll-film with a translucent backing strip and provided with an opening through the back for exposing the backing strip of the film to view for the production thereon of an inscription by a writing implement, and a plate within the camera adapted for insertion between the backing strip and the sensitive film, said plate being of a length to extend across and beyond the opening through the back of the camera toward the unwinding spool end of the camera and there curved in the direction of travel of the film and toward that portion of the film constituting the carrier for the sensitized emulsion, and said plate adjacent to the curved end being bent to direct the sensitive film into the focal plane of the camera.

24. A camera for using a roll-film with a translucent backing strip and provided with openings through the back spaced apart by a distance equal to the travel of the film from one position in the camera to the next position in order, one opening exposing the backing strip of the film to access for the production directly thereon of an inscription by a writing implement, and the other opening having means for exposing to actinic light a circumscribed area of the sensitive surface of the film through the portion of the backing strip having the inscription thereon, and a sight window in the back of the camera provided with indicating means for determining the accurate positioning of the roll film with respect to the openings through the back of the camera, whereby corresponding accuracy of positioning is obtained with respect to the area affected by the camera lens image and the inscription area.

25. The method of producing negative inscriptions upon films of roll-film cameras in which the roll-film is provided with a translucent backing and the camera with openings adjacent to the path of the film and spaced apart in the direction of travel of the film, which method consists in exposing the inscription-receiving area of the backing to direct access through one of the openings in the camera and at the same time protecting the underlying sensitive film from actinic light, producing an inscription directly upon the visible portion of the backing in material resistant to actinic light, moving the film and its backing to bring the inscription thereon into coincidence with the second opening in the back of the camera and there exposing the sensitive emulsion of the film to actinic light reaching it through the backing about the inscribed portion thereof whereby the inscription appears clear upon a shaded ground in the developed negative.

26. The method of producing inscribed negatives with a camera having spaced openings through its back and containing a roll film having a translucent backing strip, for the subsequent production of inscribed prints from such negatives, said method consisting in exposing the backing at one of the openings in the camera to direct view and access with the adjacent sensitive portion of the film protected from actinic light, producing an inscription in material resistant to actinic light, within the area thus exposed, moving the film and backing within the camera so that the inscription area of the backing strip is brought into register with the second opening in the back of the camera, then exposing the inscribed area to actinic light to allow such light to act upon the sensitive emulsion through the inscribed backing except where the film is protected by the inscription, whereby in the developed negative the inscription appears clear upon a dark background and in a print made from the negative the inscription appears dark upon a light background.

27. The method of producing inscribed negatives with a roll-film camera having spaced openings adjacent to the path of the roll-film therethrough, the roll film being provided with a translucent backing strip, which method consists in exposing the backing strip to direct access and view through one of the openings in the camera with the sensitive portion of the film protected from access of actinic light, producing on the visible portion of the backing an inscription in material resistant to actinic light within the area thus exposed with the material obtained from a source exterior to the camera, moving the inscribed area across the image field of the camera and into coincidence with the second opening in the back of the camera, and subsequenetly exposing that portion of the sensitive emulsion of the film coinciding with the inscribed area to the effects of actinic light reaching it through said second opening and through the inscribed area of the backing to allow the light to act upon the sensitive emulsion in the inscribed area except where the film is protected by the inscription, whereby in the developed negative the inscription appears clear upon a dark background and in a print made from the negative the inscription appears dark upon a light background.

28. The method of producing inscribed negatives with roll-film cameras for the subsequent production of inscribed prints from such negatives, the camera having spaced openings through its back adjacent to the path of the film through the camera and the film having a translucent backing strip, which method consists in exposing the inscription receiving portion of the backing to direct access and view through one of the openings in the camera with the adjacent portion of the sensitive film protected from access of actinic light, producing the inscription in material resistant of actinic light within the area thus exposed to view and accessible, moving the film and inscribed backing so that the inscription is brought into coincidence with the other opening in the camera, and there exposing the sensitive emulsion where covered by the inscribed area of the backing to the effects of actinically weakened light reaching the sensitive emulsion through the inscribed portion of the backing strip to allow such weakened light to act upon the sensitive emulsion except where the film is protected by the inscription, whereby in the developed negative the inscription appears clear upon a dark background and in a print made from the negative the inscription appears dark upon a light background.

29. The method of light printing inscriptions upon sensitive films in roll-film cameras with the roll film having a translucent backing, which method consists in first exposing to view and access a circumscribed area of the translucent backing with the underlying sensitive surface of the film protected from actinic light and with the inscription in light retarding form, then moving the film and backing to bring the inscription to another position in the camera from that where it was applied, the sensitive surface of the film protected from actinic light during such movement, and then exposing the sensitive surface of the film to the action of actinic light reaching the film through the inscribed backing over an area immediately surrounding the inscribed surface with the actinic value of the light so reaching the sensitive surface reduced with respect to the actinic value of the light exterior to the camera.

30. The method of light printing inscriptions upon the sensitive surface of a roll film provided with a backing transmissible of actinic light and mounted in a roll film camera, which method consists in first producing an inscription upon the face of the roll film backing remote from the sensitive surface while the roll film is in the camera and the sensitive surface is protected from actinic light, then moving the inscribed area across the image field of the camera, and subsequently exposing that portion of the sensitive emulsion of the film backed up by the inscribed area to the effect of actinic light of reduced actinic value with respect to the actinic value of the light exterior to the camera.

31. A casing within which a sensitized photographic element having an actinically translucent member associated therewith may be protected from light, and in which casing the sensitive element and translucent member may be shifted together from one portion of the casing to another, and through which translucent member light may be transmitted to act upon the sensitized photographic element, said casing having a part so located and constructed that the translucent member while in the casing may have a portion of its surface accessible from the exterior of the casing, means for preventing actinic light from penetrating deeper into the interior of the casing than the translucent member at the accessible portion of said translucent member, and said accessible surface of the translucent member being adapted to receive an inscription of less transmitting properties to actinic light than the translucent member, and means located at another part of the casing from the part thereof where the translucent member is accessible for the application of an inscription, whereby light may be admitted through the translucent member at the place where it contains the inscription, to light print said inscription on the sensitized photographic element.

32. A casing within which a sensitized photographic element may be protected from light and also held in position for exposure, said casing being provided with the usual means for feeding the sensitized element, said sensitized photographic element having associated therewith an actinically translucent member movable therewith and having a surface adapted to receive an inscription differing in light transmitting properties from said member, means in the casing for separating the sensitized element and the translucent member in the ordinary feeding of the sensitized element, said means protecting the sensitized element from the effects of actinic light before permitting the translucent member and sensitized element to be subsequently brought together, the casing being arranged for permitting access to and view of the translucent member while the sensitized element is protected from actinic light, and means located at the part of the casing where the translucent member and sensitized element are brought together, whereby light may be admitted through the inscribed portion of the translucent member while in printing relation to the sensitized element to light print the inscription on said sensitized element.

33. A casing within which a sensitized photographic element may be located and selectively positioned, said element having an actinically translucent member associated therewith, and said translucent member having a surface adapted to receive an inscription differing in light-transmitting properties from the translucent member, said casing having an opening through which the translucent member is accessible for the production of an inscription thereon, and another opening separated from the first-named opening, and with which second opening the inscribed portion of the translucent member and associated photographic element may be made to register, means for
5 protecting the sensitized photographic element from the effects of actinic light where and when the translucent member is exposed for access to apply the inscription, and means associated with the second-named
10 opening whereby light may be admitted through the inscribed portion of the translucent member to light print the inscription on the sensitized photographic element.

In testimony that I claim the foregoing as my own I have hereto affxed my signature 15 in the presence of two witnesses.

ELMER G. KESLING.

Witnesses:
JOHN H. SIGGERS,
DAVID R. WAGNER.

Copies of this patent may be obtained for five cents each, by addressing the "Commissioner of Patents, Washington, D. C."